United States Patent [19]
Mathews
[11] 3,786,321
[45] Jan. 15, 1974

[54] COLOR CAMERA TUBE TARGET HAVING INTEGRAL INDEXING STRUCTURE

[75] Inventor: James Robert Mathews, Reading, Pa.

[73] Assignee: Bell Telephone Laboratories, Incorporated, Murray Hill, Berkeley Heights, N.J.

[22] Filed: Mar. 8, 1973

[21] Appl. No.: 339,179

[52] U.S. Cl. .. 317/235 R, 317/235 N, 317/235 NA, 313/66, 317/234 N
[51] Int. Cl. .......... H01l 15/00
[58] Field of Search .......... 317/235 N, 235 NA; 313/66

[56] References Cited

UNITED STATES PATENTS

| | | | |
|---|---|---|---|
| 3,669,768 | 6/1972 | Beadle | 148/187 |
| 3,676,715 | 7/1972 | Brojda | 307/304 |
| 3,548,233 | 12/1970 | Cave | 313/65 |
| 3,467,880 | 9/1969 | Crowell | 315/11 |
| 3,676,727 | 7/1972 | Dalton | 313/66 |
| 3,654,476 | 4/1972 | Hakki | 250/211 J |
| 3,697,832 | 10/1972 | Manaoka | 317/235 R |
| 3,609,399 | 9/1971 | Manaoka | 313/66 |
| 3,649,889 | 3/1972 | Hart | 317/235 R |
| 3,633,064 | 1/1972 | Merman | 315/12 |

*Primary Examiner*—Martin H. Edlow
*Attorney*—H. W. Lockhart

[57] ABSTRACT

In color camera tubes having capacitance compensated indexing strips, two sets of interdigitated conductive indexing strips are placed on the cathode side of a camera tube target onto which the scene is focused. These conducting strips, which enable referencing of the electron beam position, are formed in a highly precise pattern by means of conductivity type zones formed within the semiconductor target itself. Typically, they may be fabricated by solid state diffusion or by ion implantation of a significant impurity in the same manner as is used to form the p-n junction diodes which comprise the imaging means of the target. Advantageously, the conductivity type zones are covered by means of selective electrodeposition with a thin metallic plating to enhance their performance.

3 Claims, 4 Drawing Figures

COLOR CAMERA TUBE TARGET HAVING INTEGRAL INDEXING STRUCTURE

BACKGROUND OF THE INVENTION

This invention relates to a color television camera and, more particularly, to the structure of a solid state semiconductor target for a color camera tube of the type having an internally generated indexing capability. In particular, the invention relates to a target using the indexing arrangement of the type disclosed in the co-pending application of A. B. Larsen Case 8, Ser. No. 230,344, filed Feb. 29, 1972, having a common assignee with this application.

In the above-identified application of Larsen, a system is described for synchronizing a reference signal with an optically generated chrominance signal. In general, this synchronization is enabled by providing on the target itself a recurring series of conductive indexing strips which function as sensors of the electron beam position. This pattern of conductive indexing strips is formed typically by a metal deposition process into a mask or by selective removal of portions of a broadly deposited metal film, also using a mask.

In the present state of the art, the definition of this conductive pattern of strips to the required preciseness is difficult, particularly with respect not only to accurate strip dimensions, but more importantly, in producing uniform and precise spacing between strips. The synchronization of the reference signal is a direct function of the accuracy and uniformity of the spacing between the conductive strips. In general, this conductive pattern has strips having a width specified in tenths of microns with the spacing between strips also specified in microns with tolerances of less than one-tenth of a micron. This is difficult to achieve by standard metal deposition processes using standard masking procedures.

Accordingly in one aspect, an object of this invention is a solid state semiconductor target structure for a color camera tube having a precisely defined array of indexing strips for enabling generation of an accurate reference signal. Ancillary to this object, it is an object of this invention to provide such an array easily and conveniently without undue complexity.

In another aspect, an object of this invention is a precise pattern of conductive strips for beam indexing purposes which have electrical characteristics comparable or better than those previously known and which are more conveniently fabricated.

SUMMARY OF THE INVENTION

In accordance with this invention, the conducting indexing strips on the silicon semiconductor target of a striped color grating camera tube comprise an interconnected array of conductivity type zones formed in the face of the silicon target itself in similar fashion to that used for the formation of the light collecting p-n junctions and which are likewise exposed to the scanning electron beam.

In a typical embodiment in which the target comprises an n-type conductivity wafer substrate, a p-type impurity, for example, boron, is selectively introduced by diffusion or ion implantation using suitable masks to form both the array of p-n junction diodes and the two comb-like sets of interdigitated conductive strips. Having formed arrays of both the p-type diode elements and the p-type conductivity type zones, a film of metal is placed only on the surface of these p-type conductivity zones by suitably biasing the target element and thus electro-depositing the metal selectively. In this context, electrodeposition is understood to encompass both electroplating and electroless plating.

This invention involves only the novel and conveniently fabricated semiconductor target structure and not any aspect of the system of the application of Larsen but rather is restricted to the more precise and more readily fabricated beam indexing target structure.

DETAILED DESCRIPTION

Figure 1:
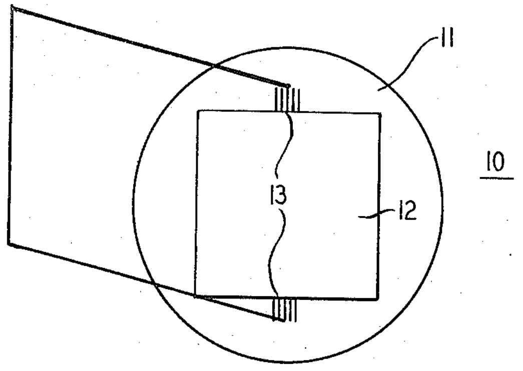
FIG. 1 is a schematic representation of a silicon semiconductor wafer with the active imaging portion outlined as a rectangle encompassing the array comprising two sets of comb-like interdigitated conductive strips each with a common terminal.

FIG. 1 is a schematic representation of one face of a silicon semiconductor target for a color television camera tube. The target 10 comprises a wafer 11 of single crystal silicon on which there is delineated a rectangular area 12 comprising the active area on the cathode face of the target. The array of conductive strips for beam indexing in accordance with this invention is formed within this active area 12. The two conductive arrays have terminals 13 to which external connection is made, as will be described hereinafter. In a typical embodiment, the wafer 11 comprising the target 10 may have a diameter of about 0.850 inch and the active area 12 may have dimensions of about 0.55 inch in the vertical direction and about 0.60 inch in the horizontal direction.

Figure 2:
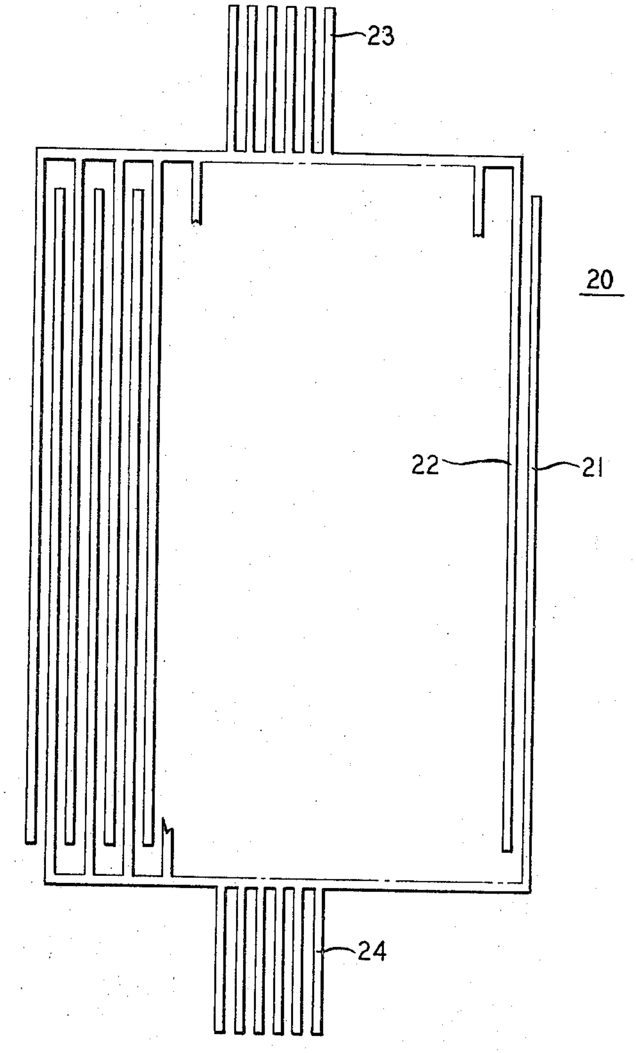
FIG. 2 is a schematic partial view of the interdigitated array of strips.

Referring to FIG. 2, there is shown a partial schematic representation of the array 20 of indexing strips. It will be understood that most of the strips are omitted for clarity and ease of explanation. The array 20 of indexing strips comprises two comb-like interdigitated sets of conducting strips 21 and 22. The set comprising strips 21 are connected in common to an array of terminal strips 24 at one side of the wafer and the other set of strips 22 are similarly connected to terminal strips 23. Other arrangements may be used alternative to the terminal strips 23-24, such as large area pads. However, the strip arrangement tends to reduce unwanted capacitance. It will be understood that, although not shown, the p-n junction diodes are distributed uniformly throughout the active area and between the conducting strips. In a specific embodiment having a triad color filter of blue, green and red, there will be three rows of p-n junction diodes between adjoining conducting strips.

In a typical embodiment in which the strips 21–22 have a width of 4 microns, each p-n junction diode may have a rectangular configuration of dimensions 13 microns by 17 microns. The spacing between the center of adjoining conducting strips 21–22 may be 105 microns with the rows of p-n junction diodes uniformly distributed between conducting strips.

Figure 3:
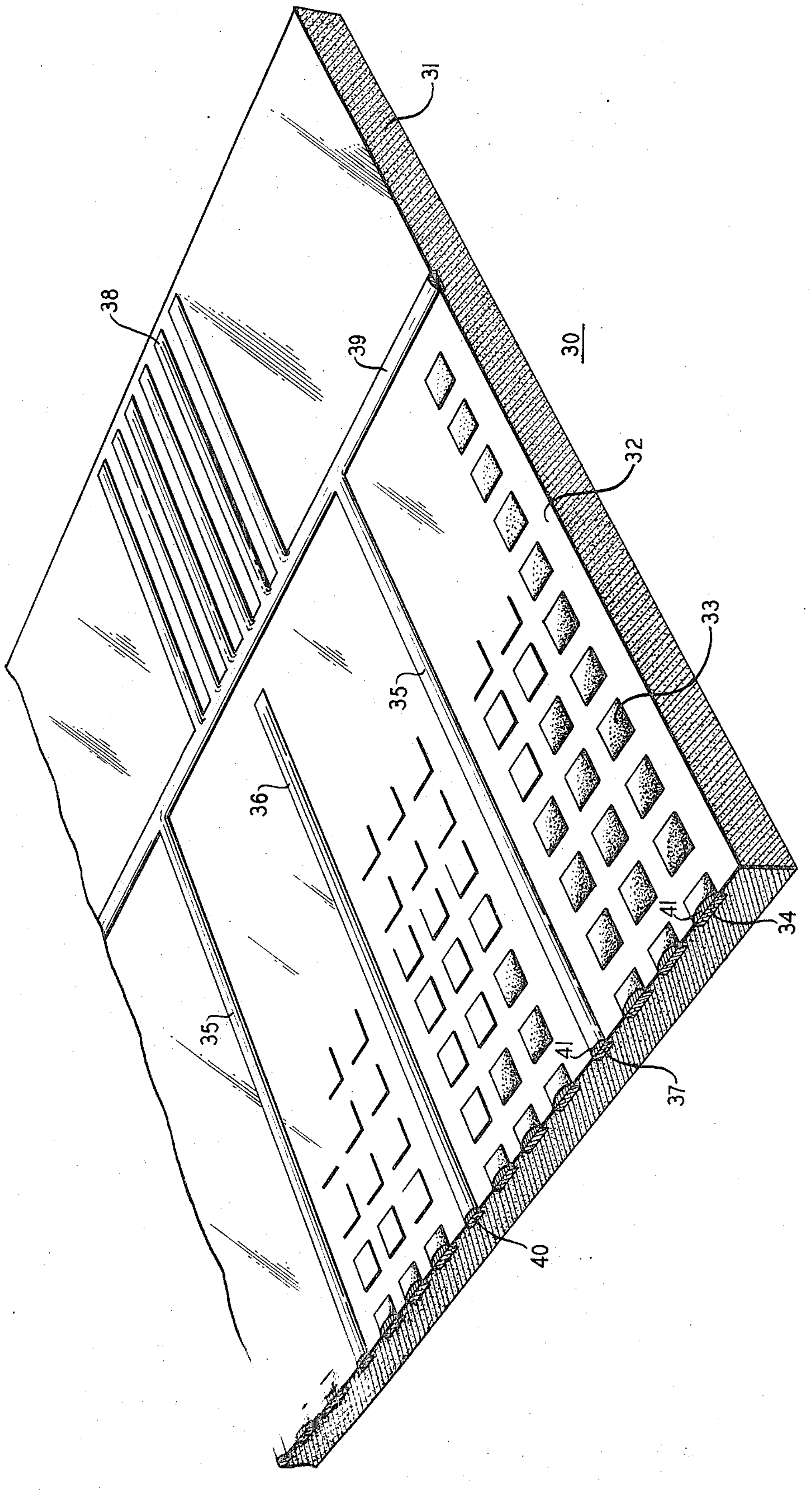
FIG. 3 is a perspective view, partially in section, of a portion of a silicon semiconductor target in accordance with this invention.

The semiconductor target with its indexing strips is shown in greater detail in FIG. 3 in which a portion 30 of the silicon wafer 31 is shown in a perspective view, partially in section. On the one face 32 of the target element 30 are the p-n junction diodes 33 of rectilinear form and in rows of three with intervening conducting strips 35 and 36. Alternate strips 35 are connected to a common connecting strip 39 which is connected to the terminal strips 38 at one edge of the target. Strip 36 is connected in common with the other set of conducting strips, not shown, and likewise to an array of terminal strips at the other edge of the target.

As indicated in the sectioned portion, the p-n junction diodes 33 are formed of p-type zones defined within the n-type silicon substrate 31. Similarly the conducting strips 35 and 36 are p-type zones within the n-type substrate. On the surface of all of the p-type conductivity type zones is a thin metallic film 41 for enhancing the conductive characteristics of these zones. An important aspect of the beam indexing arrangement resides in the preciseness and consistency of the spacing between the conducting strips 35 and 36. Inasmuch as the indexing signal has an important time function, this spacing, coupled to the beam scanning operation, is important in providing an accurate signal.

Figure 4:
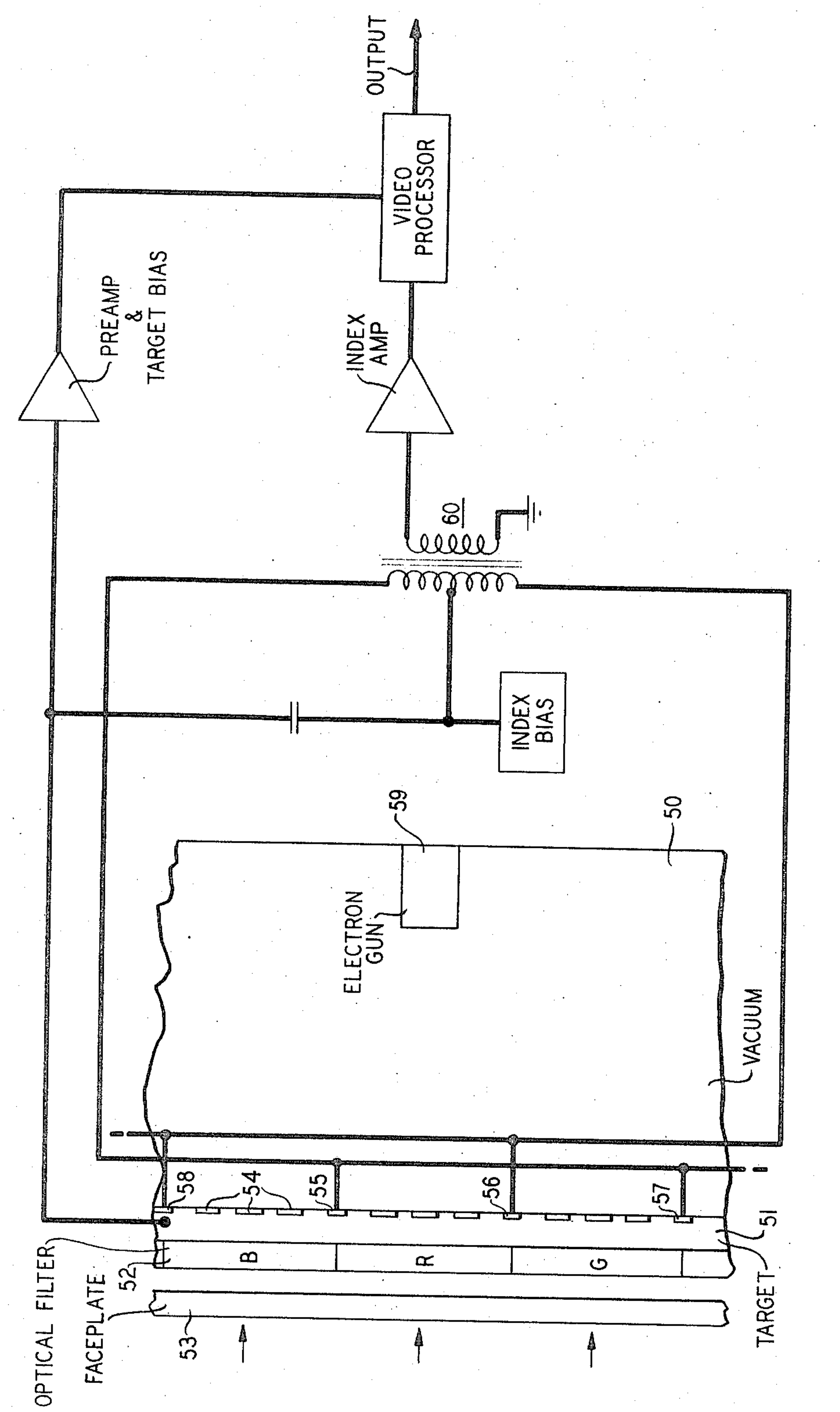
FIG. 4 is a schematic diagram of a portion of the camera tube showing the target structure and associated electrical circuitry.

Referring to FIG. 4, there is shown schematically the manner in which the beam indexing structure of the target is connected with other elements of the camera tube. The area 50, defined by a continuous outline, represents a portion of the camera tube which contains the critical imaging elements. These elements comprise the silicon semiconductor target 51 with an adjoining optical filter 52. The arrows directed at the face plate 53 indicate the impingement of light from the object being imaged. Disposed away from the opposite face of the target 51 is an electron gun 59 for generating and controlling the electron beam which scans the cathode face of the target and thus enables generation of the video signal. This face of the target contains the p-n junction diodes 54 and conductive indexing strips 55–57 which are connected in common as one set and strips 56–58 of the second set. The external circuit comprising the transformer 60 and the various biased sources, amplifiers and video processor are similar in function to that disclosed in the above-identified application of Larsen. Thus, as disclosed in that application, the bias is applied from the target substrate of n-type conductivity across the p-n junction diodes and the conducting strips. This bias produces a depletion layer adjoining each p-n junction and extending into the n-type substrate. In the case of the indexing strips 55, 56, 57 and 58 this bias is sufficiently great to produce a relatively wide depletion zone which effectively reduces the parasitic capacitance which occurs as a consequence of the provision of this indexing arrangement.

The fabrication of the indexing strips including their metal film coatings requires only a minimal alteration of the regular fabrication procedure of the silicon target. A typical fabrication procedure for a target of this type is found in U.S. Pat. No. 3,669,768, granted June 13, 1972 to W. E. Beadle, K. E. Benson, J. R. Mathews and L. H. Von Ohlsen. Using the process therein described to make the beam indexing array in accordance with this invention, the diode array mask is altered to include the array of beam indexing strips so that the silicon oxide mask for the diffusion heat treatment delineates not only the p-n junction diode array but also the array of conductive strips. Consequently, the boron diffusion then produces the array of p-n junction diodes 33, as shown in FIG. 3 and the array of conducting strips 35–36. Following the boron diffusion step, the wafer is subjected to a metal plating step using electrodeposition, either electroplating or electroless metal plating. In either of these procedures the metal deposits selectively only upon the surface of the p-type conductivity type zones which therefore insures a continuation of the high degree of resolution achieved in the oxide masked diffusion step. Thus, the formation of the advantageous beam indexing structure described herein is carried out with a minimum of departure from standard target fabrication procedure and with all the precision offered by the oxide masked diffusion procedure. It will be understood, as suggested hereinbefore, that ion implantation of boron or other p-type impurities may be used alternatively for the above-described solid state diffusion. It will be understood also that the fabrication of the target may include other steps, such as the deposition of a resistive sea, and other features as described in the above-noted patent.

The variations in the conductive step arrangements proposed in the above-identified disclosure of Larsen relating to the width of conductive strips, their number and placement are all likewise within the contemplation of this invention. It is to be understood that the specific embodiments set forth herein are merely illustrative of the principles of the invention. Other arrangements in accordance with these principles may be devised by those skilled in the art without departing from the spirit and scope of the invention.

What is claimed is:

1. A target for a color television camera tube having an electrical sensing structure for providing a reference signal comprising a monocrystalline semiconductor body essentially of one conductivity type and in the shape of a slice having opposed substantially parallel major faces, said body having adjoining one major face, a regularly disposed array of discrete regions of opposite conductivity type defining with the major portion of said body an array of p-n junction diodes, characterized in that also adjoining said one major face there is an array of parallel strip regions of opposite conductivity type intervening said diode regions, alternate strip regions being connected in common to form a pair of interdigitated comb-like arrays.

2. A target in accordance with claim 1 in which the adjoining parallel strip regions are regularly spaced.

3. A target in accordance with claim 1 in which said strip regions of opposite conductivity type have a thin metal film on the surface thereof.

* * * * *